March 18, 1941.   E. HIRANO   2,235,106

SLIDE RULE

Filed April 7, 1938    4 Sheets-Sheet 1

INVENTOR
Eimei Hirano
BY
Samuel Scrivener Jr.
ATTORNEY

March 18, 1941.  E. HIRANO  2,235,106
SLIDE RULE
Filed April 7, 1938  4 Sheets-Sheet 2

INVENTOR
Eiiui Hirano
BY
Samuel Scrivener Jr.
ATTORNEY

March 18, 1941.   E. HIRANO   2,235,106

SLIDE RULE

Filed April 7, 1938   4 Sheets-Sheet 3

Inventor
EIMEI HIRANO
By
Samuel Scrivener Jr.
Attorney

March 18, 1941.   E. HIRANO   2,235,106
SLIDE RULE
Filed April 7, 1938   4 Sheets-Sheet 4

INVENTOR
Eimei Hirano
BY
Samuel Scrivener Jr.
ATTORNEY

Patented Mar. 18, 1941

2,235,106

UNITED STATES PATENT OFFICE 2,235,106

SLIDE RULE

Eimei Hirano, Tokyo, Japan, assignor to The Hemmi Seisakusho Co., Shibuya-ku, Tokyo, Japan Application April 7, 1938, Serial No. 200,710

1 Claim. (Cl. 235—70)

My invention relates to improvements in a slide rule and more particularly to a precision slide rule.

In order to increase precision a very long slide rule has been supposed to be necessary, but as for the length of a slide rule there is a positive limit in practicability.

The object of this invention is to provide a super-precision slide rule which may be operated to give any desired computation without moving the end of the slide beyond the center line of the rule.

Figure 5:
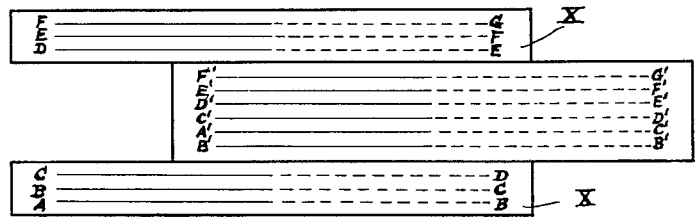
Figure 6:
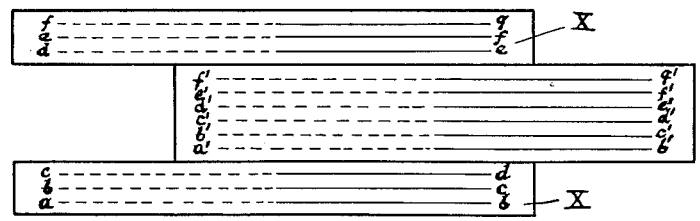
Figure 7:
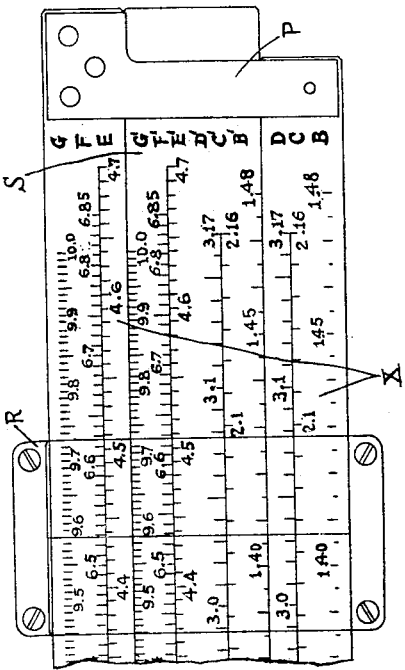
Figure 7:
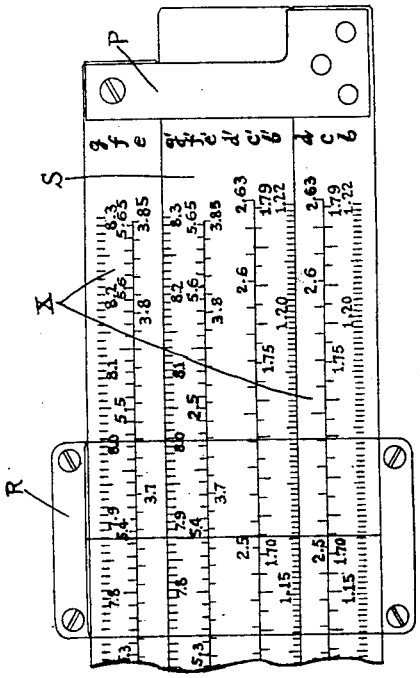
Figure 7:
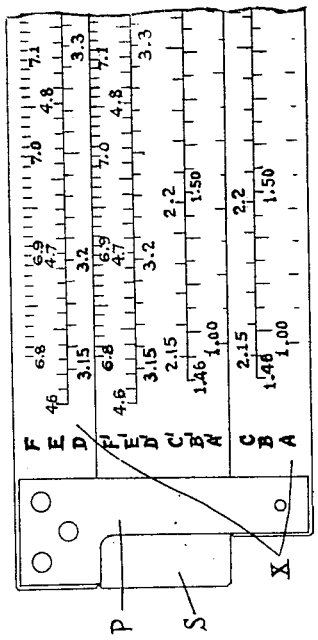
Figure 8:
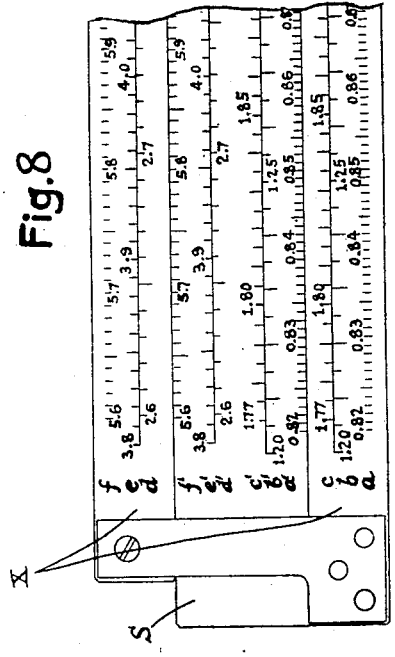
Figure 11:
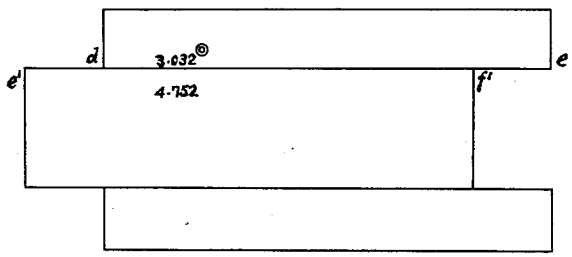

For a better understanding of my invention, reference is taken to the accompanying drawings, wherein Figs. 1 to 4 are diagrammatic representations taken for illustrating an arrangement of scales according to this invention; Figs. 5 and 6 are diagrammatic views taken for explanation purposes of the principle of the remedy to "scaling off"; Figs. 7 and 8 are partial front and back views respectively of a specific slide rule built up by the present invention; Figs. 9 to 14 are diagrammatic views for illustrating some examples of using the present slide rule.

Figure 1:
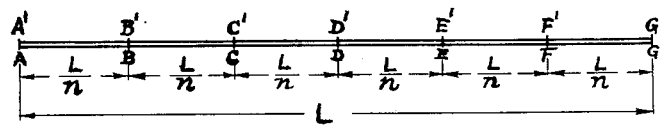

Prior to entering into detailed construction of the slide rule, I will explain the principle of arranging scales in this invention. Referring to Fig. 1, L represents the length of a couple of original scales A—G and A'—G' of a logarithmic scale or of numbers from 1 to 10, one on the fixed bars of a slide rule and the other on the sliding bar, to work in cooperation with each other. In accordance with this invention, each of the original scales, L in length, is divided into $n$ equal parts, A—B, B—C, C—D, ..., F—G and A'—B', B'—C', C'—D', ..., F'—G', so that every part shall be $$\frac{L}{n}$$

long where $n$ is either 6 or some multiple of 6, the practical upper limit being 30. Each divided part is elongated $n$ times so that every part could cover the original length L of the original scale. The elongated part scales A—B, B—C, C—D, ..., F—G and A'—B', B'—C', C'—D', ..., F'—G' are arranged in superposed parallel rows between the two definite ends of a space L/n, the former group on the fixed bars of a slide rule and the latter group on the sliding bar, as per the diagrammatic view in Fig. 2. In this manner two groups of overlapping scales of any desired precision, one on the fixed bars and the other on the sliding bar, can be obtained.

Figure 3:
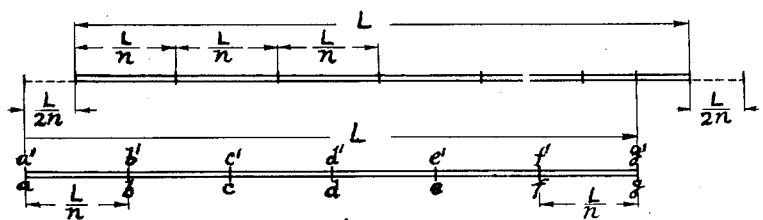

Now referring to Fig. 3, taking exactly the same two group of original scales, A—G and A'—G' shown in Fig. 1, one-half scale length of a division illustrated in Fig. 1, namely $$\frac{L}{2n}$$

of the original scale length, is extended from one end of the original length L, and $$\frac{L}{2n}$$

is discarded off at the other end. In other words, the initial space of the scale is shifted one $2n$th part to either direction, the total length being unchanged. Note in a slide rule with plain logarithmic scales only, it is all the same to make the shifting either from right to left or vice versa. Each of the shifted couple of scales is divided into the same number of parts as the former scale, or into $n$ equal parts, $a$—$b$, $b$—$c$, $c$—$d$, ..., $f$—$g$, and $a'$—$b'$, $b'$—$c'$, $c'$—$d'$, $f'$—$g'$. Each part is elongated $n$ times so that every part scale could cover the original length of either original scale. One of the elongated two groups of part scales, $a$—$b$, $b$—$c$, $c$—$d$, ..., $f$—$g$, are arranged overlappingly on the fixed bars in addition to the first group, A—B, B—C, C—D, ..., F—G, and the other group $a'$—$b'$, $b'$—$c'$, $c'$—$d'$, ..., $f'$—$g'$, similarly on the sliding bar in addition to $a$—$b$, $b$—$c$, $c$—$d$, ..., $f$—$g$. See the illustration in Fig. 4. It is preferable for compactness to adopt the duplex type of a slide rule, and calibrate the first two groups of scales represented diagrammatically in Fig. 2 on the front face of the slide rule, and the last two groups of scales represented diagrammatically in Fig. 4 on the back face. But if the breadth of the slide rule may be increased, all of the four groups, two illustrated in Fig. 2 and the other two in Fig. 4, can be well calibrated on the front face, in cases such as a slide rule of monoface type which does not admit its back face available.

Figure 2:
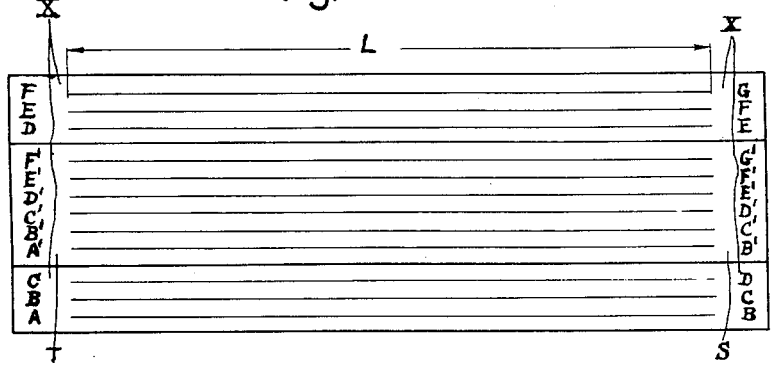
Figure 4:
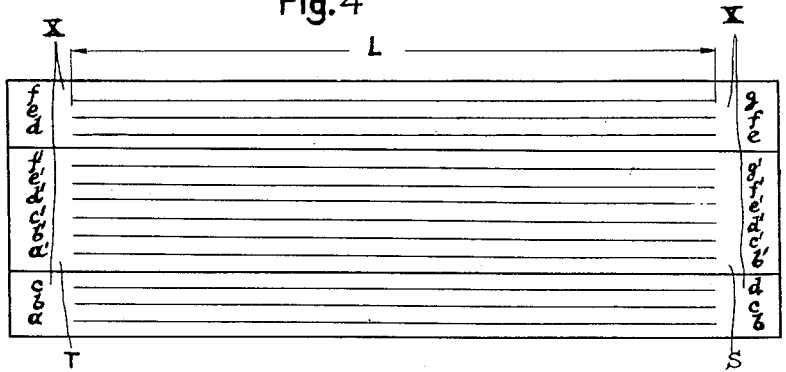

Now if a slide rule had only the two primary groups of scales as per the diagrammatic view in Fig. 2, without the secondary groups as shown in Fig. 4, there would come frequently a big trouble of so-called "scaling off." The addition of the secondary, that is, the shifted groups to the primary groups, is a perfect remedy; it does obviate the scaling off perfectly and absolutely, provided the sliding bar is not projected out any longer than half the scale length or $$\frac{L}{2}$$

And the sliding bar can be surely kept within the berth of half the scale length. This shall be explained once again with reference to Figs. 5 and 6, wherein Fig. 5 is the front view of slide rule calibrated in accordance with the above described principle of this invention and Fig. 6 is the back view of same. The lefthand half of every scale is shown in a full line, and the righthand half in a dotted line; and in Fig. 6, just in the reverse way. In this slide rule I shall show how the scaling off is obviated. The sliding bar shall not be projected out any longer than half the scale length, and it is unnecessary to do so. Suppose the sliding bar is projected out to the right, and the left end index of the scales on the front face of the sliding bar is set at any point on the lefthand half of the front face of the fixed bars, the lefthand half of scales on the sliding bar is perfectly "lapping on" the scales on the fixed bars as shown in Fig. 5 and though the righthand half of the scales on the sliding bar is partly scaling off the fixed bars, it is perfectly made up on the back face, as shown in Fig. 6. A point of one reading which is located on the righthand half of the front face of the sliding bar has its exact equivalence on the lefthand half of the back face of the sliding bar, and that exactly at half the scale length longitudinally left of the original point. So this proves that all the front face of the sliding bar might be assumed to be "lapping on" the fixed bars. A like explanation could be made when the sliding bar is projected out to the left direction provided that the sliding bar is not projected out any longer than half the scale length.

An example of the slide rule having a specific arrangement of scales according to this invention is shown in Figs. 7 and 8. In these figures, X represents the fixed bars secured together at both ends by plates P with a required space between them to allow a sliding bar S to be slidably inserted in the space longitudinally between the fixed bars. R represents an indicator with a hairline thereon to be slidably mounted on the fixed bars to be commonly used for both faces. The primary group of scale A—B, B—C, C—D and D—E, E—F, F—G of natural logarithms are calibrated on the front face of the lower and upper fixed bars respectively, from bottom to top in due order of rows. The order could be made in any other way, such as from top to bottom, as it is only for convenience of lesser importance. And the secondary group, A'—B', B'—C', C'—D', ..., F'—G' of the same nature is calibrated on the front face of the sliding bar S, and that in the same order as the first group. On the back faces of the fixed bars and of the sliding bar, there are calibrated the same but shifted groups of scales $a$—$b$, $b$—$c$, $c$—$d$, ..., $f$—$g$, and $a'$—$b'$, $b'$—$c'$, $c'$—$d'$, ..., $f'$—$g'$ respectively which are assumed the secondary groups, in similar successive order as shown in Fig. 8.

The manner of using the present slide rule will be explained, taking some numerical examples as follows:

*Example 1.*—$6.947 \times 5.381 = ?$

Figure 9:
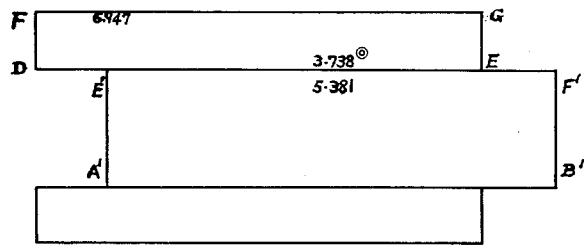

Referring to Fig. 9, set 1 on scale A'—B' on the sliding bar to 6.947 on scale F—G on the fixed bars, against 5.381 on scale E'—F' on the sliding bar, then 3.738 will be found out on scale D—E on the fixed bars for the answer 37.38.

*Example 2.*—$6.381 \times 4.752 = ?$

Figure 10:
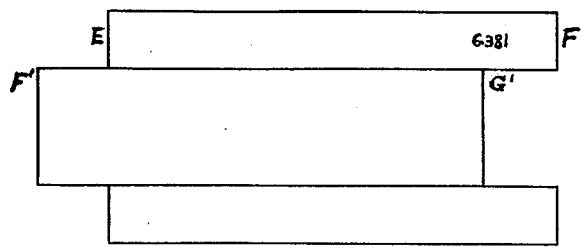

Referring to Fig. 10, set 10 on scale F'—G' on the sliding bar to 6.381 on scale E—F on the fixed bars, against 4.752 on scale $e'$—$f'$ on the sliding bar, read 3.032 on scale $d$—$e$ on the fixed bars for the answer 30.32.

*Example 3.*—The area of the six continents are given in a table below, find out percentage of each item.

| | Sq. kilometers |
|---|---|
| Asia | 43,260,000 |
| Europe | 10,190,000 |
| North America | 24,040,000 |
| South America | 18,240,000 |
| Africa | 30,000,000 |
| Australasia | 8,560,000 |
| Total | 134,290,000 |

Figure 12:
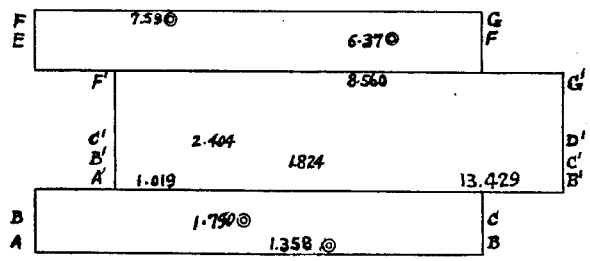
Figure 13:
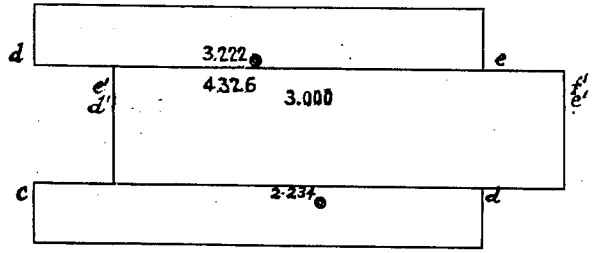
Figure 14:
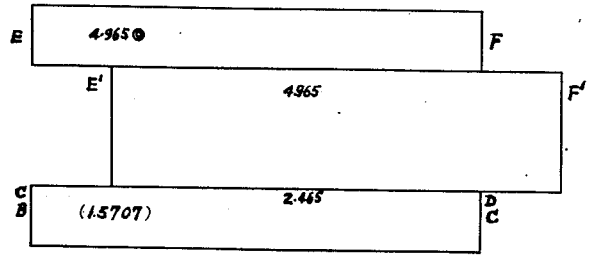

Referring to Figs. 12 and 13, set 1.3429 on scale A'—B' on the sliding bar to 10 on scale F—G on the fixed bars, against 4.326 on scale $e'$—$f'$ on the sliding bar, read 3.222 on scale $d$—$f$ on the fixed bars; against 1.019 on scale A'—B' on the sliding bar, read 7.59 on F—G on the fixed bars; against 2.404 on scale C'—D' on the sliding bar, read 1.790 on B—D on the fixed bars; against 1.824 on scale B'—C' on the sliding bar, read 1.358 on scale A—B on the fixed bars; against 3.000 on scale $d'$—$e'$ on the sliding bar, read 2.234 on scale $c$—$d$ on the fixed bars; against 8.560 on scale F'—G' on the sliding bar, read 6.37 on E—F on the fixed bars. And the answers expected are 32.22, 7.59, 17.90, 13.58, 22.34, 6.37% respectively.

Extraction of the square root $\sqrt{N}$ of a positive number N is done by trial. There is a method to accomplish it quite by a single stage, but for learning purposes it is better to do it in two stages: first to find the first three useful figures of the root with an auxiliary slide rule, say some 25 cm. long, and then to find the fourth figure with the present slide rule. Mind, a short pocket slide rule some 10 cm. long, is quite sufficient for the purpose. Also you can well manage the whole job even without any auxiliary slide rule. But with one, it can be accomplished much easier. That is, the slide rule of this invention is for precesion only or for the fourth figure only.

Have an approximation of $\sqrt{N}$ by a tiny slide rule, to 2 or 3 places. Test the approximation with the present slide rule, and then make correction for finish. And the correction can be done by a mere adjustment by muscle. It is really a good way for rapidity as well as for precision.

*Example 4* (Fig. 14).—Calculate $\sqrt{24651225}$ knowing that the original number is a perfect square.

This is done by a trial method. Take a rough approximation of the square root, say 4.97. As it is now known after trial that 4.97 is too big, try 4.965, as it is surely a nearer approximation. Set 1 on scale A'—B' on the sliding bar to 4.965 on scale E—F on the fixed bars, and against 4.965 on scale E'—F' on the sliding bar, read 2.465 on scale C—D on the fixed bars. And as the last trial has proved satisfactory the answer must be $\sqrt{24651225}=4965$.

As another example see 5.0 on scale E—F, which is equal to $\sqrt{25}=\sqrt{N}$. If the hairline of the indicator is placed over 5.0 on scale E—F, the value of $\sqrt{10N}=\sqrt{250}$ may be read directly from scale B—C as 15.88. Thus, when the square root of any number N has been found, the square root of $10N$ may be instantly determined by merely reading on the proper scale under the hairline. Conversely, if it is desired to find $\sqrt{N}$, the hairline may be set to the value of $\sqrt{N/10}$ on the fixed scale, if this is known, and $\sqrt{N}$ may be read directly.

By this trial method the cube root of a number N may also be determined. To effect this, set one of the indices of the primary group of scales on the sliding bar to the cube root of M (M is a number close to N and a perfect cube) on the primary group of scales on the fixed bars. Against $$\sqrt[3]{M^2}$$

on the sliding bars (which may always be easily determined and is always a whole number) read M on the fixed bar. If M happens to be equal to N then the cube roots of M and N will be equal. If M is not equal to N, the difference between their cube roots may be determined by slight adjustments.

As an example of the determination of cube roots, assume the problem of finding the cube root of 3 (=1.442). First, take 1.4 as a trial cube root. Set the center index 1 on scale $a'$—$b'$ on the reverse of the slide to 1.4 on scale $b$—$c$. Opposite 1.4 on $b'$—$c'$ read 1.96 on $c$—$d$. Opposite 1.96 on $c'$—$d'$ read 2.744 on $d$—$e$. As 2.744 is less than 3, take 1.45 as a second trial cube root. Set 1 on $a'$—$b'$ to 1.45 on $b$—$c$. Opposite 1.45 on $b'$—$c'$ read 2.101 on $c$—$d$. Opposite 2.101 on $c'$—$d'$ read 3.049 on $d$—$e$. As 3.049 is greater than 3, take 1.44 as a third trial cube root. Set 1 on $a'$—$b'$ to 1.44 on $b$—$c$. Opposite 1.44 on $b'$—$c'$ read 2.074 on $c$—$d$. Opposite 2.074 on $c'$—$d'$ read 2.987, which is slightly less than 3. Try 1.442 as a third trial cube root. Set 1 on $a'$—$b'$ to 1.442 on $b$—$c$. Opposite 1.442 on $b'$—$c'$ read 2.080 on $c$—$d$. Opposite 2.080 on $c'$—$d'$ read 3.000 on $d$—$e$. Hence 1.442 must be the correct cube root.

Having obtained the cube root of 3, the cube roots of 30 and 300 may be easily obtained. Set the indicator at 1.442 on $b$—$c$ and under the hairline read 3.107 (cube root of 30) on scale $d$—$e$ and read 6.694 (cube root of 300) on scale $f$—$g$.

In general if $n$, the number of part scales in the group, be 6 or some multiple of 6 and if the scale is logarithmic, when the square root of a number N has been obtained the square root of 10N may be had without further manipulation by the steps set forth hereinbefore. Further if the cube root of a number N has been obtained the cube roots of 10N and 100N may be obtained without further manipulation by the steps set forth hereinbefore. These advantages and new results are due to the discovery by applicant that they may be achieved if $n$ is 6 or a multiple of 6, it being apparent that both 2 and 3 are factors of 6 thus making the extraction of square and cube roots possible by the very simple methods described.

It is noteworthy to see that a slide rule with the primary two groups of scales represented in Fig. 2, and without the secondary groups represented in Fig. 4, cannot accomplish extraction of a cube root. With the secondary group in addition, it can do it without fail. When the original scale is of a cyclical nature such as a logarithmic scale of numbers, both groups of scales for the primary and secondary scales can be made just of one cycle each, while they are different in phase from each other. In such a case, it is practically the same to shift the scale either to the left or to the right. From 1 to 10 it is a logarithmic scale unit or one cycle, from 0.8254 to 8.2540 it is another, from 1.2115 to 12.115 it is another.

While I have illustrated and described one embodiment of my invention and have set forth examples of how this may be employed, it will be apparent to those skilled in the art that other modifications may be made and various improvements and changes may also be made, all without departing in any way from the spirit or scope of the invention, for the limits of which reference must be had to the appended claim.

I claim:

In a slide rule of the type comprising two parallel fixed bars secured together with space therebetween and a bar slidably inserted into the space between the said fixed bars, a primary group of scales arranged in $n/2$ parallel rows on the face of each of the fixed bars to complete one logarithmic scale unit of numbers from 1 to 10 and being of length L when connected linearly in continuous succession, a secondary group of scales on the reverses of the fixed bars which are similar to the scales of the primary group but are shifted with respect thereto by $L/2n$ and are arranged in $n/2$ parallel rows on each of the fixed bars, a primary and a secondary group of scales arranged on the face and reverse sides of the sliding bar respectively which correspond respectively to the said primary and secondary groups on the fixed bars, the primary group of scales on the sliding bar being adapted and arranged to work in cooperation with the primary group of scales on the fixed bars and the secondary group of scales on the sliding bar being adapted and arranged to work in cooperation with the secondary group on the fixed bars, $n$ being 6 or a multiple of 6.

EIMEI HIRANO.